United States Patent Office 3,400,212
Patented Sept. 3, 1968

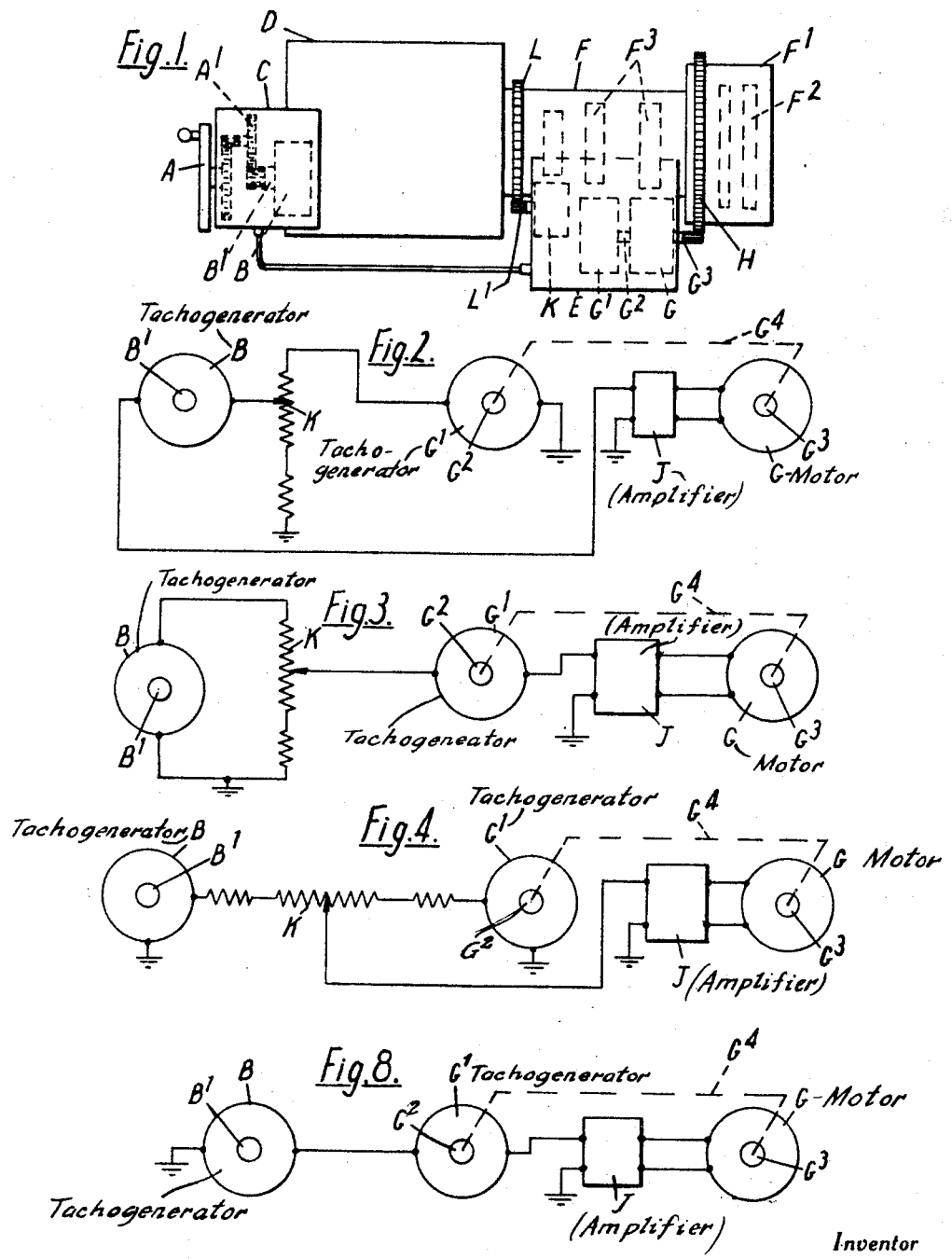

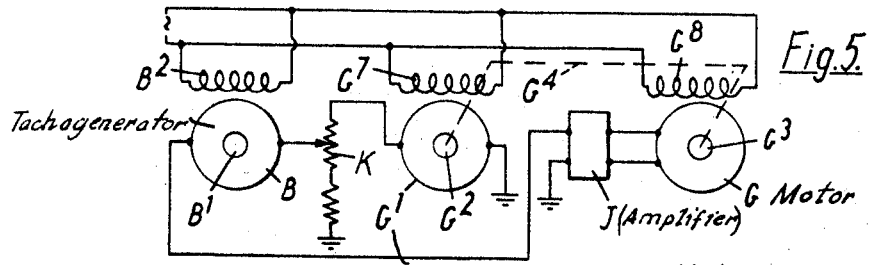
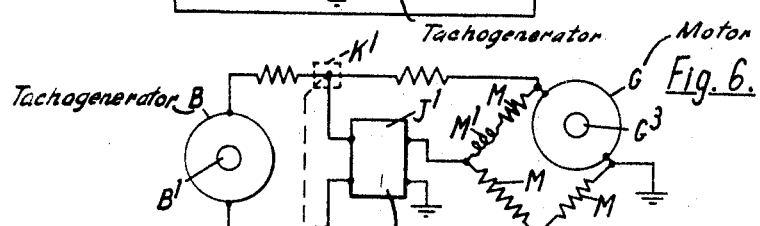
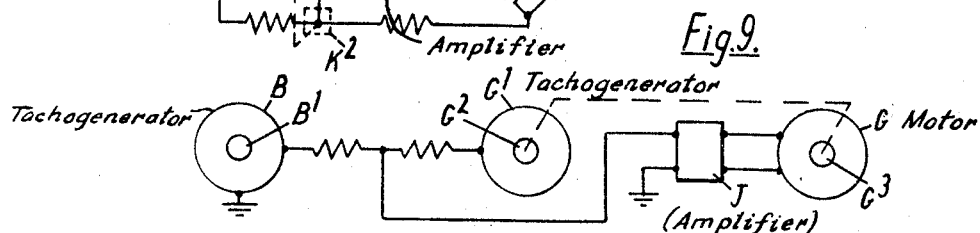
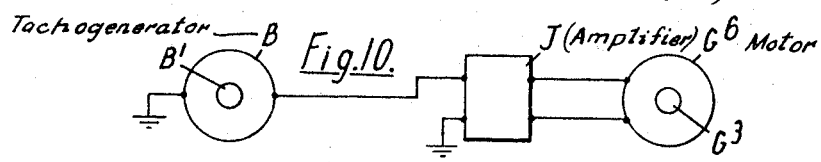
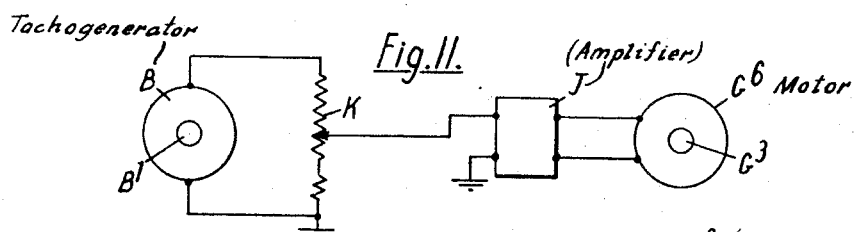
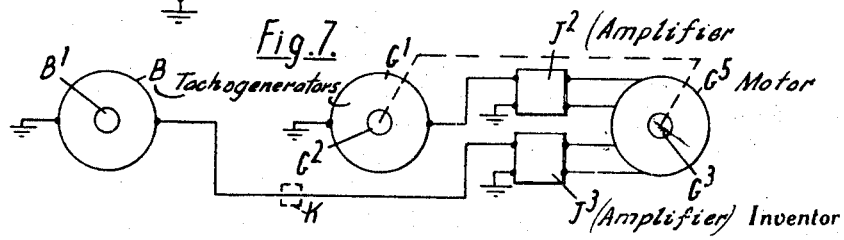

3,400,212
CONTROL MECHANISMS FOR AN OPTICAL OBJECTIVE HAVING A ZOOM CONTROL ELEMENT
Dexter R. Plummer, Leicester, England, assignor to Rank Precision Industries Limited, trading as The Rank Organisation Rank Taylor Hobson Division, Leicester, England, a British company
Continuation of application Ser. No. 338,073, Jan. 16, 1964. This application Aug. 28, 1967, Ser. No. 663,902
Claims priority, application Great Britain, Jan. 18, 1963, 2,282/63
4 Claims. (Cl. 178—7.92)

ABSTRACT OF THE DISCLOSURE

Control mechanism for an optical objective of the zoom type comprising means for effecting movement of a movable optical member of said system in accordance with the movement of a first control element, said mechanism comprising an electrically energized prime mover for driving said movable member and having an output drive whose speed is dependent on a controlling voltage input to such prime mover, a tachogenerator having an output voltage approximately proportional to the speed at which it is driven, a transmission mechanism interposed between said first control element and such tachogenerator whereby the tachogenerator is driven at a speed greater than and approximately proportional to the speed of movement of said first control element, amplifying means whose output constitutes the said controlling voltage input to the prime mover, means for supplying an input to the amplifying means which is dependent on the output voltage of the tachogenerator and comprises sensitivity adjustment means for varying the relationship between the speed of movement of the driven member and that of said first control element, a second control element controlling the movement of a second movable member of said optical system, and means connecting said second control element with said sensitivity adjustment means, so that the proportional relationship between the speed of movement of the driven member and that of the first control member is dependent on the position of said second control element.

---

The above entitled application is continuation of U.S. application 338,073 filed Jan. 16, 1967, now abandoned.

This invention relates to a control mechanism for effecting movement of a driven member in accordance with the movement of a demand element. Usually, although not essentially, the demand element is constituted by a hand control movable at will by an operator, whilst the movement of the driven member is usually but not essentially effected by means deriving its power, at least partly, from a source other than the demand element.

The object of the invention is to provide a simple and inexpensive control mechanism in which movement of the demand element produces movement of the driven member with the minimum of undesirable effects due to time lag.

The control mechanism according to the invention comprises an electrically energized prime mover for driving the driven member and providing an output drive at a speed dependent on a controlling voltage input, and a tachogenerator driven by the demand element and having an output voltage which is approximately proportional to the speed of movement of the demand element and on which depends the controlling voltage input to the prime mover.

With this arrangement, provided that the controlling input voltage to the motor bears a constant relationship to the output voltage of the tachogenerator, the position of the driven member follows the position of the demand element very closely, but any error in such positional relationship is not made up after the demand element stops since the prime mover also stops substantially simultaneously with such demand element. Unexpectedly, this is often advantageous.

The prime mover preferably forms part of a speed-responsive servo device wherein the controlling voltage input is compared with a voltage dependent on the speed of the prime mover. For example, a preferred arrangement of such speed-responsive device comprises a reversible electric motor directly driving a second tachogenerator, one or more controlling voltage inputs to the motor being derived from the outputs of the first and second tachogenerators.

Sensitivity adjustment means may be provided for varying the relationship between the speed of movement of the driven member and the speed of movement of the demand element. In this case, the positional relationship between the demand element and the driven member becomes variable with operation of such means. Such means may act, for example, to vary the magnitude of the voltage input to the prime mover, such voltage input remaining also dependent on the speed of the demand element. When a speed-responsive servo-device is employed, such sensitivity adjustment means may conveniently comprise means for varying the relative magnitudes of the voltages which are compared in the speed-responsive servo-device.

One useful application of the above-described mechanism is in the control of an optical system, wherein the driven member is constituted by an optical member movable within the system to effect focussing and the demand element is constituted by a focussing control element.

For example, the optical system may consist of an optical objective of the zoom type having members relatively movable under the control of a zoom control element for effecting continuous variation of the equivalent focal length of the objective throughout a range whilst maintaining constant the position of the image plane, and also having part of the objective movable under the control of a focussing control element to suit different object distances. In such an objective, the depth of focus varies appreciably with variation in the equivalent focal length. For example, in an objective having a maximum equivalent focal length ten times that of the minimum equivalent focal length, the depth of focus at minimum equivalent focal length may be about one hundred times that at maximum equivalent focal length. This is disadvantageous in that the independent focussing control is only of appropriate sensitivity, even within fairly wide acceptable limits, for one portion of the range of variation of equivalent focal length. For controlling such an objective of the zoom type, the movement of the zoom control element may conveniently also act progressively to vary a transmission ratio in the transmission between the focussing control element, and the movable part of the objective controlled thereby. Thus, in the present control device, the zoom control element is linked with the sensitivity adjustment means. In this connection it should be mentioned that the sensitivity adjustment means may act to vary the said transmission ratio either continuously or in steps and the term "progressively" is to be interpreted accordingly. For rendering the focus control of appropriate sensitivity throughout the range of zoom, the sensitivity adjustment means is conveniently arranged to act in such a manner that, for a given operation of the focussing control, the movement of the part of the objective movable for focussing progressively increases towards the end of the range of zoom corresponding to the smallest equivalent focal length, and vice versa.

Further features of the invention will be apparent from the practical arrangements of control mechanism now to be described by way of example with reference to the following drawings, for convenience also with reference to the use of such mechanism in controlling an optical objective of the zoom type also having a focussing control. The optical objective will be assumed to form part of a camera, for example a television camera, having the object at its front and the objective controls at its rear, with an adjacent monitor screen for use by the operator. In the drawings, FIGURE 1 shows, in diagrammatic form, the television camera with the control mechanism mounted thereon.

FIGURES 2 to 4 respectively show details of three differing preferred practical arrangements of the control mechanism of FIGURE 1, operating on an electrical direct-current basis and each incorporating a servo-device and sensitivity adjustment means, FIGURE 5 shows an alternative practical arrangement of control mechanism corresponding to that of FIGURE 2 but operating on an alternating-current basis, FIGURE 6 shows a further practical arrangement of control mechanism wherein the servo-device is replaced by an equivalent feed-back device, FIGURE 7 shows yet a further practical arrangement of control mechanism wherein the servo-device employs a special construction of electric motor, FIGURES 8 and 9 show two simple arrangements of control mechanism wherein the sensitivity adjustment means is omitted, FIGURE 10 shows an arrangement of control mechanism not employing a servo-device or equivalent feedback device, and FIGURE 11 shows the arrangement of FIGURE 10 with the inclusion of sensitivity adjustment means.

In the arrangement of FIGURE 1, the focussing control element is in the form of a hand wheel A which is coupled through gearing $A^1$ to the input shaft $B^1$ of a tachogenerator B to drive such tachogenerator at a considerably faster speed than the speed of the hand wheel. This tachogenerator B and the associated gearing may conveniently be accommodated in a small housing C on the side of the camera D at its rear end. The gearing $A^1$ may of course be arranged in various ways other than that shown and may if desired be replaced by a friction drive.

The output of the tachogenerator B, which is proportional in sense and magnitude to the sense and speed of movement of the hand wheel, is fed to an electrical servo-device contained in a housing E on the side of the objective housing F at the front of the camera D. In FIGURE 1, the sizes of the housings C and E are considerably exaggerated for clarity, since in practice these housings and the parts within them may be quite small. The servo-device comprises a reversible electric motor G and a second tachogenerator $G^1$ having an input shaft $G^2$ rigid with the output shaft $G^3$ of the motor, the motor output being taken from this shaft through reduction gearing H so as to drive the part of the objective movable to effect focussing. In a preferred arrangement, the movable part of the objective is constituted by a part $F^2$ of the front member of the front assembly of the objective only, accommodated within the enlarged front part $F^1$ of the objective housing F, and is movable by means of a simple helical drive requiring relatively low torque. This enables a relatively low power drive to be employed, so that an electric motor of small size may be employed, together with quiet gearing.

The servo-device also includes a high gain multi-stage amplifier J (see FIGURE 2), to which is applied not only the output voltage of the first tachogenerator B driven by the hand wheel A, but also a voltage derived from the output voltage of the second tachogenerator $G^1$ driven by the motor G.

As also shown in FIGURE 2, the output of the second tachogenerator $G^1$ is fed back to the amplifier J, in opposition to the input voltage due to the first tachogenerator B, through a potentiometer K which is controlled by the zoom control element (not shown). Thus, the second input voltage to the amplifier J is constituted by the output voltage of the second tachogenerator $G^1$ attenuated by the potentiometer K, the degree of attenuation depending on the position of the zoom control element and thus on the equivalent focal length of the objective. In FIGURE 1, the gear driving the parts $F^3$ of the objective movable within the objective housing F for zooming is shown at L, with a gear coupling $L^1$ between this driving gear L and the potentiometer K. The gear L may be driven from the zoom control element in a variety of ways, but conveniently a servo-device may be employed for this purpose also, as will later be referred to in connection with FIGURES 8 and 9.

The operation of the above-described servo-device may best be understood by first considering focus control while the zoom control L, $L^1$ is held fixed, whereby the attenuation afforded by the potentiometer K remains constant, so that the input to the amplifier J due to the second tachogenerator $G^1$ is dependent only on the speed of the motor G and thus on the speed of movement of the movable part $F^2$ of the objective. The arrangement, in this circumstance, constitutes a speed controlling servo-device in which the speed of the driven member $F^2$ is proportional to the speed of the hand wheel A, and the change in position of the movable part of the objective proportionately corresponds to the change in position of the hand wheel. In contrast with a position-controlling servo-device, however, there is substantially no time lag in the response of the movable part $F^2$ of the objective to stopping of the hand wheel A, the movable part of the objective stopping substantially simultaneously with stopping of the hand wheel. This feature, which is effective whatever the setting of the potentiometer K, is advantageous when the operator is working by use of a monitor screen. On the other hand, even with potentiometer setting constant, it will be realised that the positional relationship between the movable part $F^2$ of the objective and the hand wheel A is less exact than in the case of a position servo-device, since any error in such relationship, for example due to saturation of the servo-device, is not made up after the hand wheel is stopped. Thus, when the hand wheel A is stopped, a large reversing voltage is at once applied to the motor G from the second tachogenerator $G^1$, whereby the motor stops substantially immediately.

The potentiometer is driven from the zoom control element through the gearing L, $L^1$ so that, at maximum equivalent focal length, the output voltage of the second tachogenerator $G^1$ has maximum effect, and progressively at reduced equivalent focal lengths, increasingly less effect. The result of this is that, for a given rotation of the hand wheel A, only a small movement of the movable part $F^2$ of the objective occurs at maximum equivalent focal length and such movement increases progressively towards the end of the range of zoom corresponding to minimum equivalent focal length. With an objective having a ratio of maximum equivalent focal length to minimum equivalent focal length of say ten, the corresponding ratio in depths of focus between the two ends of the scale is about a hundred, but since variation in sensitivity of the focus control is acceptable within fairly wide limits, the potentiometer K will usually be arranged only partly to offset the change in depth of focus, so as to maintain such sensitivity within such acceptable limits.

The presence of the potentiometer K in the feed-back circuit of the servo-device means that there is no predeterminable relationship between the position of the movable part $F^2$ of the objective and the position of the hand wheel A, since the movement of the hand wheel to effect focussing at any particular time is dependent on the position of the zoom control element. However, this is not disadvantageous since, when the operator is working from a monitor screen, it is usually unnecessary to provide any focussing scale for the hand wheel. Nevertheless, it should be made clear that, apart from the other advantages thereof, it is the use of a speed-controlling servo-device, rather than a position-controlling servo-device, which makes practicable the use of the above-described potentiometer K for sensitivity adjustment. With a position-controlling servo-device, it is impracticable to effect sensitivity adjustment by means of such a potentiometer, without causing undesired movement of the movable part $F^2$ of the objective. It is to be noted that, in the above-described arrangement, movement of the zoom control element does not affect the focus setting, which is adjusted solely by movement of the focussing control hand wheel A.

It will be clear that the above-described potentiometer K may alternatively be used to vary the proportion of the input voltage of the first tachogenerator B which is applied to the amplifier J, as shown in FIGURE 3, or yet again be used as a potential divider acting to vary the attenuation in inverse proportions, of the output voltages of both tachogenerators B and $G^1$, as shown in FIGURE 4. It is also practical to incorporate such potentiometer as part of a push-pull circuit in the amplifier. Furthermore, such potentiometer K may be replaced by a variable reactance device in an alternating-current system. By way of example, FIGURE 5 illustrates an alternating-current system generally analogous to the arrangement of FIGURE 2. Control windings for the tachogenerators B and $G^1$ and the motor G are shown at $B^2$, $G^7$ and $B^8$ respectively, connected across a common alternating-current source. The arrangements of FIGURES 3 to 5 will be clear without further description, and in these figures the same reference letters are used as in FIGURE 2 for corresponding parts. In each of FIGURES 2 and 5 and in further figures, the broken line $G^4$ serves to indicate that the output shaft $G^3$ of the motor G is rigid with the input shaft $G^2$ of the tachogenerator $G^1$.

In an alternative arrangement of control device operating on a direct-current basis and shown in FIGURE 6, the above-described servo-device is replaced by an analogous device comprising a reversible direct-current electric motor G, connected in one arm of a bridge circuit also comprising resistances M and a compensating inductance for the motor $M^1$. An amplifier $J^1$ has two inputs, respectively positive and negative, to which are applied positive and negative outputs from the first tachogenerator B and negative and positive feed-backs from two opposite corners of the bridge circuit G, M and $M^1$. The output of the amplifier $J^1$ is taken to a third corner of the bridge circuit, the fourth corner being earthed. With this arrangement, the feed-back to the amplifier $J^1$ is representative of the back electro-motive-force of the motor G, which is dependent on the speed thereof. A potentiometer for sensitivity adjustment may be incorporated either in the feed-back circuits or in the output circuits of the first tachogenerator or in the amplifier. Alternatively, as indicated by the broken lines, such potentiometer, which is formed in two ganged parts $K^1$, $K^2$ in view of the two inputs to the amplifier $J^1$, may act as a potential divider between the output voltage of the first tachogenerator B and the feed-back voltage of the bridge circuit G, M and $M^1$. With this arrangement, the voltage applied to the motor, for a fixed position of the potentiometer $K^1$, $K^2$, is as before proportional to the difference between two voltages proportional to the speeds of the focussing control hand wheel A and the movable part $F^2$ of the objective, so that the arrangement in effect constitutes a speed-controlling device acting in the same manner as the servo-device in the arrangement previously described.

The arrangement last described with reference to FIGURE 6 is illustrative of a number of ways in which a feed-back circuit may be employed to cause a correcting voltage to be applied to the motor G, without requiring the use of a second tachogenerator. Moreover, if desired, instead of a single controlling input voltage for the motor, derived from the output voltage of the first tachogenerator and from the feed-back voltage, the last two mentioned voltages may be amplified and used to provide two controlling input currents for a motor, for example of the constant armature current type, having two control field windings. In this instance, which is illustrated in FIGURE 7, the two currents are amplified by means of a two part amplifier $J^2$, $J^3$ and are compared in the motor, indicated at $G^5$, and a correcting torque is applied at the output shaft $G^3$. In this arrangement, as in other arrangements, the potentiometer constituting the sensitivity adjustment means may be connected in the circuit of either controlling input voltage, for example as indicated at K in the output circuit of the tachogenerator B. While the arrangement of FIGURE 7 shows a control mechanism also incorporating a second tachogenerator $G^1$ so as to form a servo-device, a constant armature current motor with two field windings may also be employed to compare the tachogenerator output voltage and the feedback voltage in an arrangement generally similar to that shown in FIGURE 6.

The above described arrangements of control device, incorporating sensitivity adjustment means, may be used for purposes other than controlling an optical objective of the zoom type. For example, such arrangements may be applied to the control of an adjustable gun turret, wherein the sensitivity of the azimuth drive transmission is determined by the setting of the elevation control. Yet again, these arrangements may be applied to controlling an optical system with a movable focussing element and an adjustable iris diaphragm, adjustment of which causes changes in the depth of focus afforded by the system. In this instance, the transmission to the focussing element incorporates the sensitivity adjustment means, which is linked to the iris diaphragm control.

Furthermore, the present invention is in no way limited to the provision of sensitivity adjustment means, but may be employed in any instance where it is desired to move a driven member in response to movement of a demand element with the minimum of undesirable effects due to time lag, the exact positional relationship between the driven member and the demand element being of subsidiary importance. For example, in an optical system having a lens or other optical element movable for focussing purposes, the operator is invariably provided with a screen or other means whereby the effect of adjustment of the focus control is rendered visible, so that accurate focus adjustment is most readily facilitated if the movable focussing element is stopped substantially simultaneously with the stopping of the focussing demand element. This is achieved by the speed-controlling means utilised in the present invention, which enables the operator to move the demand element until the desired result, for example exact focussing, is obtained, regardless of the precise positional change of the demand element which is required to bring about such result.

Thus, for completion of the understanding of the invention, FIGURES 8 and 9 show two arrangements which are respectively similar to the arrangements of FIGURES 3 and 4 except that the sensitivity adjustment means is omitted. In these figures, the same reference letters as those employed in previous figures are retained for similar parts. Either of these modified arrangements may conveniently be employed for driving the gear L for moving the parts $F^3$ of the objective movable to effect zooming, the tachogenerator B being driven from the zoom control element.

FIGURE 10 shows a very simple arrangement of the invention which may be useful in certain applications, more especially when the velocity, at which the velocity demand element is to be moved, lies within a relatively limited velocity range. Thus, in this simple arrangement, a servo-device is not employed, but the output of the first tachogenerator B is fed through an amplifier J directly to a motor G⁶ as the sole controlling voltage therefor, such motor conveniently being of the well-known kind whose speed is proportional to its input voltage throughout a chosen range. Finally, FIGURE 11 shows a modification of the arrangement of FIGURE 10 wherein sensitivity adjustment means K is incorporated in the output circuit of the tachogenerator B.

What I claim as my invention and desire to secure by Letters Patent is:

1. In an optical system comprising an optical objective of the zoom type wherein zooming is controlled by a zoom control element, a control mechanism for effecting movement of an optical member movable for focussing in accordance with the movement of a focussing control element, comprising an electrically energized prime mover for driving the movable member of the objective and having an output drive whose speed is dependent on a controlling voltage input to such prime mover, a tachogenerator having an output voltage approximately proportional to the speed at which it is driven, a transmission mechanism interposed between the focussing control element and such tachogenerator whereby the tachogenerator is driven at a speed greater than and approximately proportional to the speed of movement of the focussing control element, amplifying means whose output constitutes the said controlling voltage input to the prime mover, circuit means whereby the input to the amplifying means is dependent on the output voltage of the tachogenerator, sensitivity adjustment means in said circuit for varying the relationship between the speed of movement of the driven member and the speed of movement of the focussing control element, and means connecting the zoom control element with the sensitivity adjustment means in such a manner that corresponding operations of the focussing control at the two end portions of the range of variation of equivalent focal length respectively result in greater and lesser movements of the part of the objective movable for focussing.

2. A control mechanism as claimed in claim 1 in which the sensitivity adjustment means acts in such a manner that, for a given operation of the focussing control, the movement of the part of the objective movable for focussing progressively increases towards the end of the range of zoom corresponding to the smallest equivalent focal length, and vice versa.

3. A control mechanism for an optical objective of the zoom type for effecting movement of an optical member movable for focussing in accordance with the movement of a focussing control element, comprising an electrically energized prime mover for driving the movable part of the objective and having an output drive whose speed is dependent on a controlling voltage input to such prime mover, two tachogenerators each having an output voltage approximately proportional to the speed at which it is driven, means whereby the first tachogenerator is driven at a speed approximately proportional to the speed of movement of the focussing control element, means whereby the second tachogenerator is driven by the prime mover, circuit means whereby the controlling voltage input to the prime mover is dependent upon the output voltages of the two tachogenerators, a zoom control element for controlling zooming of the objective, and sensitivity adjustment means operatively connected to the zoom control element for varying the relationship between the speed of movement of the driven member of the objective and the speed of movement of the focussing control element in accordance with movement of the zoom control element.

4. In a optical system, a control mechanism for effecting movement of a movable optical member of said system in accordance with the movement of a first control element, said mechanism comprising an electrically energized prime mover for driving said movable member and having an output drive whose speed is dependent on a controlling voltage input to such prime mover, a tachogenerator having an output voltage approximately proportional to the speed at which it is driven, a transmission mechanism interposed between said first control element and such tachogenerator whereby the tachogenerator is driven at a speed greater than and approximately proportional to the speed of movement of said first control element, amplifying means whose output constitutes the said controlling voltage input to the prime mover, means for supplying an input to the amplifying means which is dependent on the output voltage of the tachogenerator and comprises sensitivity adjustment means for varying the relationship between the speed of movement of the driven member and that of said first control element, a second control element controlling the movement of a second movable member of said optical system, and means connecting said second control element with said sensitivity adjustment means, so that the proportional relationship between the speed of movement of the driven member and that of the first control member is dependent on the position of said second control element.

References Cited

UNITED STATES PATENTS

| | | | |
|---|---|---|---|
| 2,147,674 | 2/1939 | Satterlee | 318—30 |
| 2,443,048 | 6/1948 | McComb | 95—45 |
| 2,891,206 | 6/1959 | Dillonaire | 318—327 |
| 2,720,817 | 10/1955 | Mills | 88—57 |
| 2,782,683 | 2/1957 | Walker | 88—57 |
| 2,984,154 | 5/1961 | Walker | 88—57 |
| 3,093,784 | 6/1963 | Mintzer | 318—327 |
| 3,283,231 | 11/1966 | Askew | 318—30 |

ROBERT L. GRIFFIN, *Primary Examiner.*

J. A. ORSINO, *Assistant Examiner.*